Oct. 6, 1970       D. H. MORGAN       3,532,362
ARTICULATED VEHICLES
Filed Dec. 8, 1967                    4 Sheets-Sheet 1

DAVID HIPPISLEY MORGAN,
INVENTOR
By Wenderoth, Lind & Ponack.
atty

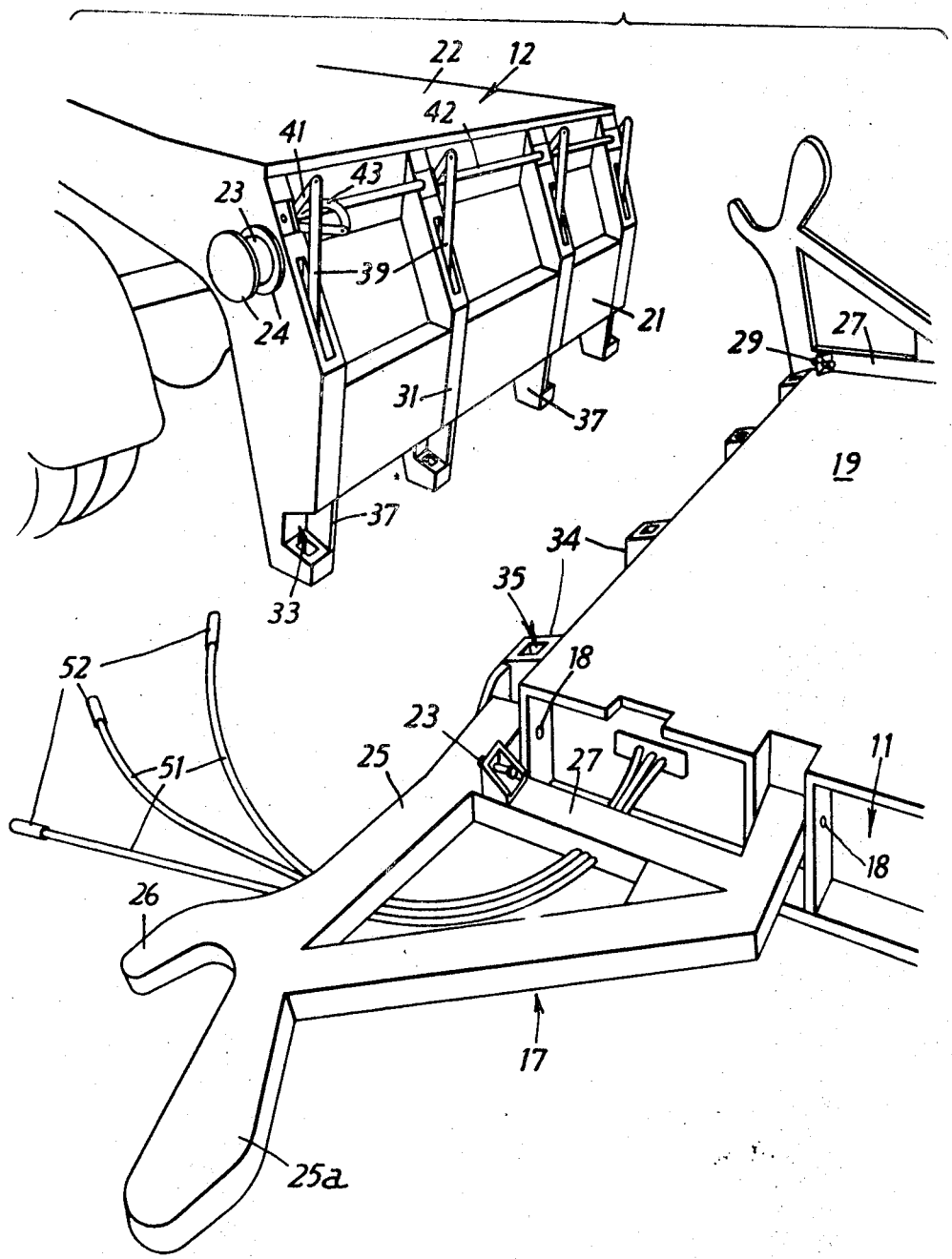

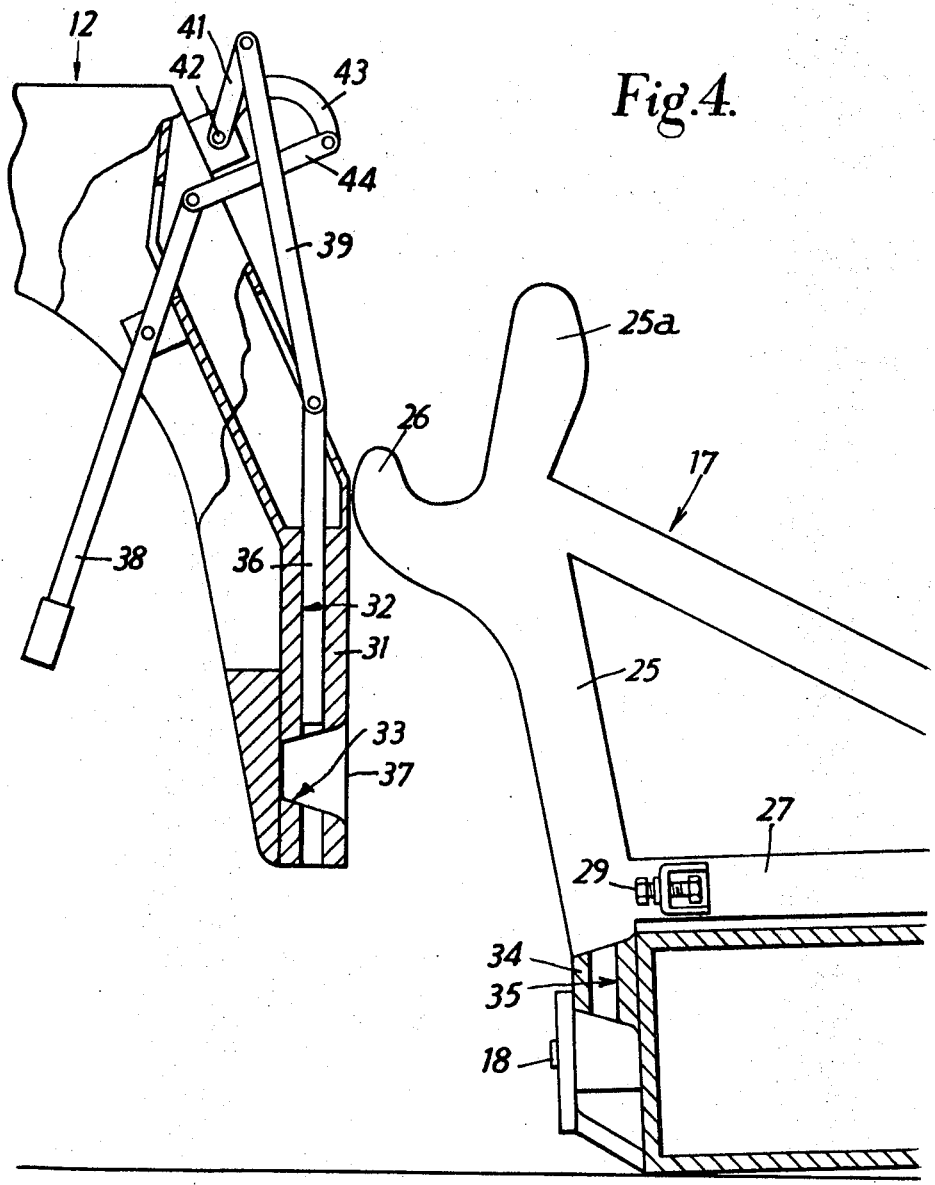

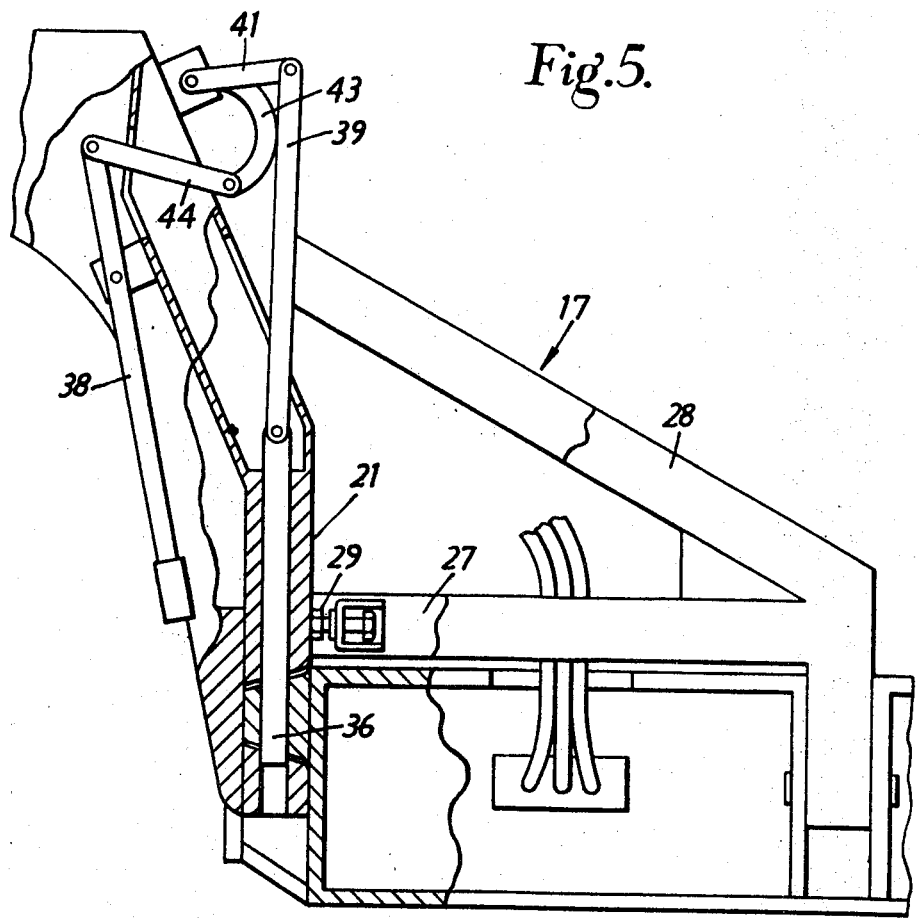

United States Patent Office 3,532,362
Patented Oct. 6, 1970

3,532,362
ARTICULATED VEHICLES
David Hippisley Morgan, Bordon, England, assignor to D. H. Morgan (Engineers) Limited, Kingsley, Borden, England, a British company
Filed Dec. 8, 1967, Ser. No. 689,179
Int. Cl. B62d 53/06
U.S. Cl. 280—425     11 Claims

ABSTRACT OF THE DISCLOSURE

A trailer or semi-trailer comprising a platform, ground-engaging wheels supporting the platform at its rear end, and connecting means for pivotally connecting the other end of the platform to means supported by a second set of ground-engaging wheels wherein the platform and the connecting means are releasably connected together by open hinge means having main horizontal pin means on the connecting means and upwardly opening hook means carried by the platform, whereby the platform can be hingedly connected to the connecting means, and locking means whereby the platform can be positively locked to the connecting means, the hinge means and the locking means being vertically spaced so that one is at or near the level of the platform and the other is located above the said level.

Figure 1:
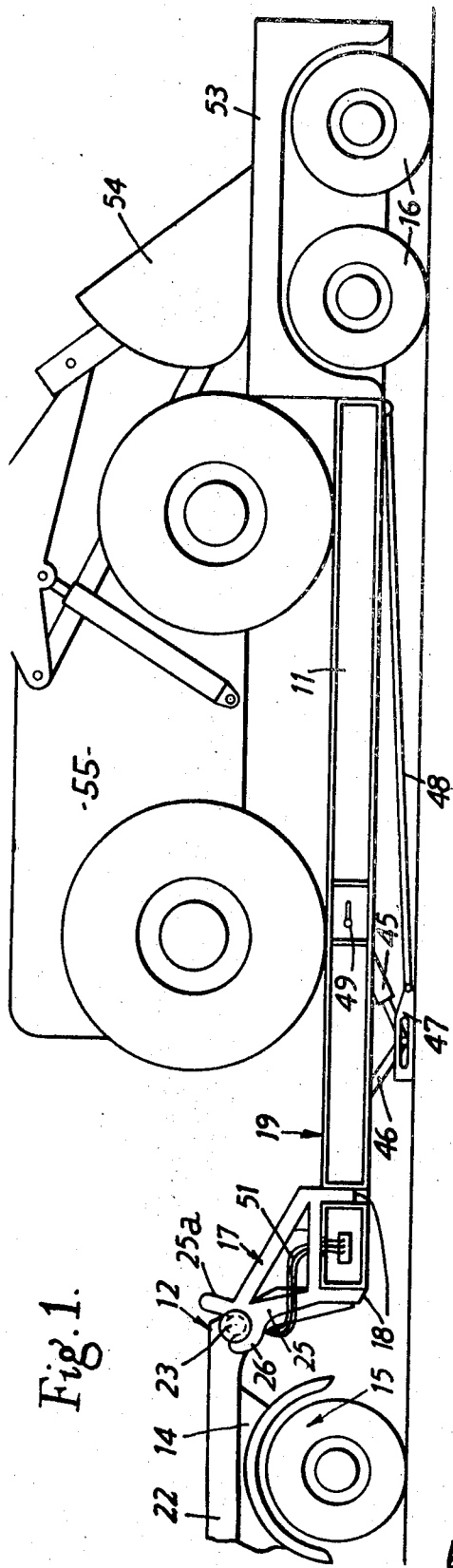

This invention relates to trailers.

By the term "trailer" is meant a vehicle adapted to carry a load and to be coupled to and drawn by a powered vehicle hereinafter called a tractor.

The trailer may comprise a load-carrying platform having a first set of ground-engaging wheels at one end—usually the rear end—and a second set of wheels pivotally connected to the platform at its other end, or the platform may have only a single set of ground-engaging wheels at the rear end, the front end being adapted to be pivotally connected to the tractor, this latter type of trailer being commonly known as a semi-trailer.

According to the present invention there is provided a trailer or semi-trailer wherein the platform and the connecting means, preferably comprising a swan neck, are releasably connected together by open hinge means (as defined below), having main horizontal pin means on the connecting means and upwardly opening hook means carried by the platform, whereby the platform may be hingedly connected to the connecting means, and locking means whereby the platform may be positively locked to the connecting means, the hinge means and the locking means being vertically spaced so that one, preferably the locking means, is at or near the level of the platform and the other, preferably the hinge means, is located above the said level.

By the term "open hinge" is meant a hinge connection allowing the hinge halves to pivot relative to each other about the hinge axis and at the same time enabling one of the hinge halves to move transversely of the hinge axis so as to become disconnected from the other hinge half.

Preferably blocking means is provided to prevent the connecting means moving upwardly relative to the platform. This would otherwise be liable to occur as the blocking means normally comprises one or more vertical pins.

The blocking means preferably comprises interengaging tongue and slot means so arranged that when the locking means are removed, the connecting means and the platform can pivot about the axis of the horizontal pin means without the tongue and slot means fouling. The locking means preferably comprises passage means and locking pin means operable to engage the said passage means to lock these together. Preferably the tongue means is comprised by one of the passage means, preferably the passage means on the platform, and the slot means is formed in the other passage means.

Embodiments of the invention suitable for use with loads of over twelve tons will not be described, by way of example, with reference to the accompanying drawings.

Figure 2:
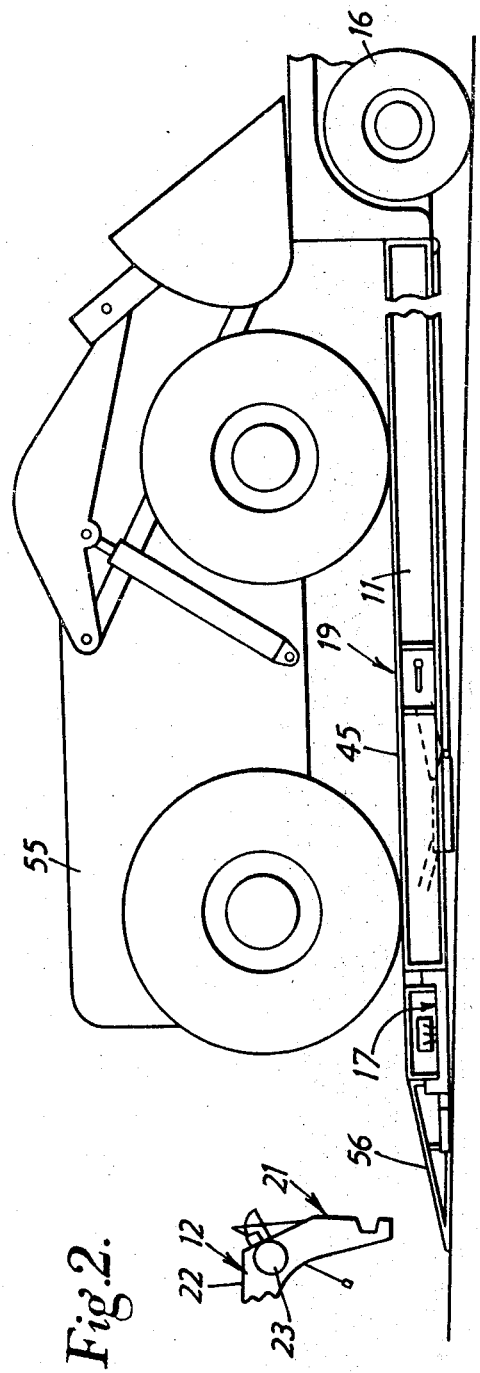

In the drawings:

FIG. 1 is a diagrammatic side view of a preferred semi-trailer of the invention immediately after loading and coupling, FIG. 2 shows a detail of the semi-trailer after loading but before coupling, FIG. 3 is a perspective view of a detail of the semi-trailer before coupling, and FIGS. 4 and 5 are detail sections showing the locking device before coupling and after locking respectively.

Referring now to FIG. 1, a semi-trailer of the invention comprises a platform 11 and a swan neck 12 which is pivotally carried on a "fifth wheel" 14 of a tractor 15. The platform 11 has sets of wheels 16 on two axles at one end and at the other end a pair of triangulated frames 17 respectively located at each side of the platform 11. The frames 17 are each mounted on hinges 18 so as to be able to pivot to below the upper surface 19 of the platform 11 (as best shown in FIGS. 2 and 3).

The swan neck 12 has a mainly vertical front member 21 which extends across the entire width of the platform 11. A horizontal member 22 extends forwardly from the front member 21 to be connected with the "fifth wheel" 14 so as to be pivoted about a vertical axis as well as an horizontal axis. (Note that as the swan neck 12 is pivotable about a horizontal axis, the terms "vertical" and "horizontal" are used in relation to members 21 and 22 in their descriptive rather than definitive sense.) Stops are provided in the usual way to limit the angular movement of the swan neck about its horizontal axis to an angle of about 10°. On each side of the swan neck at the junction between the members 21 and 22 there is provided a pin member 23 consisting of a roller on a stub shaft and having flanges 24 at its inner and outer ends.

Each frame 17 has a main upright member 25 which is slightly longer than the front member 21. Near the upper end each member 25 has a rearwardly inclined top part 25a and an upwardly facing hook 26. The frame 17 also comprises a horizontal member 27 at the lower end of the member 25 and an inclined member 28 joins the end of the horizontal member 27 to the upright member 25 near the hook. The horizontal member is provided with a stop 29 in the form of a bolt head mounted in a channel-shaped member welded to the horizontal member. This stop 29 butts against the front member 21 when the platform is coupled to the swan neck 12 (as best seen in FIG. 5).

The front member 21 is provided with four vertical box section members 31 providing square section passages 32. Near their lower ends, the box members 31 are provided with trapezoidal slots 33. The platform 11 is provided on its forward end with four correspondingly shaped tongue members 34 which are located near the upper surface 19 of the platform 11 and which are of the same transverse section as the box members 31. When the tongue members 34 are received with the slots 33, the passages 35 in the tongue members 34 register with the passages 32. Slidably mounted within the passages 32 are square sectioned locking pins 36 which are movable as will be hereinafter described. When the tongues 34 are received within the slots 33, the passages 32 and 35 register and the pin 36 can pass through the passages 35 so as to lock the platform 11 to the swan neck 12. Side pieces 37 are provided on the inner surfaces of the various box members 31 (as best shown in FIG. 3) to ensure accurate lateral registration between the tongue members 34 and slots 33.

The locking pins 36 are movable in synchronism by manually operable lever 38 (see FIGS. 4 and 5) through a linkage mechanism. The upper ends of the locking pins 36 are pinned to a connecting link 39 which at its free end is pivotally connected to a crank link 41 secured on to a shaft 42 running horizontally of the member 21. A semi-circular cranked lever 43 is also secured to this shaft 42 and its free end is connected by a link 44 to the upper end of the lever 38. The configuration of the linkage is such that when the inclination of the lever 38 approaches the inclination of the front member 21, the locking pins 36 will be in their lowermost locking position (as shown in FIG. 5) and, when the lever 38 is inclined to the front member 31 the locking pins 36 are raised (as shown in FIG. 4).

The platform 11 also carries a pair of pneumatic or hydraulic jacks 45 (see FIG. 1). These jacks 45 are pivoted at their cylinder end and their piston rods are pivoted to supporting links 46 so as to form therewith, in effect, a toggle joint. The piston rod end and link 45 are connected to a ground-engaging plate 47 which is also located by a longitudinally extending pivoted rod 48. When the jack 45 is extended, the ground-engaging plate 47 is moved downwardly with respect to the platform 11 so that, when the plates 47 engage the ground, the platform 11 will be lifted upwardly pivoting about the rear wheel suspension.

The hydraulic jack 45 is driven by an hydraulic pump operated by an electric motor energised by batteries carrieod by the platform 11 (these items are not shown on the drawings). A control knob 49 is provided to control operation of the jack 45.

The platform 11 is provided with pneumatically operated fail safe brakes and the brake hoses 51 are connected by releasable couplings indicated generally at 52 to the tractor. The length of the brake cables 51 is such that the lever 38 cannot be moved to remove the locking pin 36 into the inoperative position until the hoses are uncoupled so as to ensure that the brakes are actuated.

Above the rear wheels 16 of the platform 11 there is a raised platform 53 which may take a weight such as the scoop 54 of a tractor 55 carried by the upper surface 19 of the platform 11. In this way, by spreading the load, the platform 11 can carry a rather heavier tractor 55 than would be the case if the total weight of the tractor 55 were to be supported by the upper surface 19 of the platform 11.

An electric cable (not shown) is provided running parallel to the hoses 51. This electric cable has a multipoint socket which may plug into plugs on the tractor and on the platform 11. When the socket is plugged into the plug on the platform an electrical connection is made between the electric circuit of the tractor and the rear lights of the platform 11 so that these may be controlled from the cabin of the tractor. When the socket is plugged into the plug in the platform 11 the circuit of the electric motor is completed so that this may now be operated by operating the lever 49.

The semi-trailer is loaded as follows from the condition in which the platform 11 is separate from the tractor 15. The triangulated frameworks 17 are pivoted downwardly into the position shown in FIG. 2 and as taken up by the nearside framework 17 in FIG. 3. Removable wooden ramps 56 are located near the end of the platform 11 remote from the wheel 16. The load, such as the tractor 55, may now be driven or winched on to the upper surface 19 of the platform 11 and the scoop 54 may in due course be lowered on to the platform 53. When the tractor 55 has its brakes applied and/or chocks located under its wheels, the ramps 56 are removed and the two frameworks 17 are brought into the upright position. The tractor 15 is reversed until the pins 23 strike the forward portions of the upper parts 25 of the upright members 25. As the swan neck 12 is on the fifth wheel this may pivot about a vertical axis relative to the tractor to ensure that both the pins 23 are engaged by the upright members 25. The electric cable having been connected to the platform socket, the lever 49 is operated causing the jack 45 to extend and thus to lift the platform 11. As the platform lifts up, the pins 23 will be received in the hook and after further lifting movement the swan neck 12 will be caused to pivot relative to the tractor body until the "horizontal" member 22 and the upper surface 19 of the platform 11 are horizontal. When these parts reach this position the tongues 34 will have penetrated into the slots 33 and the tongue passages 35 will be in register with the passages 32. The lever 38 is now depressed so that the locking pins 36 engage in the passage 35 locking the platform 11 to the swan neck 12. The jack 45 is retracted lifting the ground-engaging plates 47. The electric cable is now unplugged from the platform and plugged to the plug on the tractor. The pneumatic hoses 51 are then connected to their connections to their couplings on the platform. The trailer and tractor are then ready for movement.

It will be seen that the trailer 11 is firmly locked to the swan neck 12 and is retained not only against relative movement in the direction of the tractor but also against vertical and transverse movement.

The unloading of the semi-trailer will take place in the reverse manner to that above described.

It will be noted that the hooks 26 and pins 23 are able to pivot relative to each other about the axis of the pins 23 but at the same time are able to move transversely to the said axis so that these constitute "open hinges" as defined. It will also be seen that as the framework 17 will have to be in the upright position when the tractor 15 is reversed, the driver will have a good view of the parts which require to interengage.

It will also be noted that the locking mechanism cannot be unlocked until such time as the pneumatic hoses 51 are uncoupled and hence the pneumatic brakes are applied to the wheel 16.

This invention is not limited to the precise constructional details hereinbefore described. In particular the platform may incorporate the various accessories and operating modifications as are well known in this art and which will be apparent to those skilled in this art as being capable of incorporation. Also it will be appreciated that the hydraulic motor carried by the platform may be driven by an internal combustion engine, preferably a pertol engine carried by the platform.

I claim:

1. A trailer comprising a platform supported by at least one axle and means for connecting the platform to a swan neck on a tractor vehicle, wherein the platform and the swan neck are releasably connected by co-axial open hinges, each comprised of a horizontal hinge pin part carried by the swan neck and a hinge bearing part carried by the paltform and arranged above the load carrying surface thereof, said hinge bearing part having an upwardly open mouth to permit entry of the hinge pin, jack means for raising and lowering the platform to bring said hinge bearing parts into and out of engagement with said hinge pin parts, and locking means spaced from and arranged below the level of said open hinges for positive connection of said platform and said swan neck to prevent relative rotation about the axis of said hinges.

2. A trailer as claimed in claim 1 wherein the locking means for positive connection of the platform and the swan neck comprises a plurality of tongues on one of said platform and said swan neck engageable in correspondingly shaped sockets in the other of said platform and said swan neck, said tongues and the walls of said sockets having alignable apertures formed therein, in which removable locking pins are engaged when the locking means are operative.

3. A trailer as claimed in claim 2, wherein all said locking pins are parallel with one another, said locking pins being coupled together for conjoint movement into and out of engagement with the apertures in said tongues.

4. A trailer as claimed in claim 2, wherein the movement of said pins is under the control of a single handle.

5. A trailer as claimed in claim 4, wherein the brakes of the trailer are operated from the tractor vehicle through fluid conduits, which are connected to the trailer through releasable couplings, said brakes being automatically applied on disconnection of said releasable couplings, said conduits being arranged to obstruct movement of said handle before disconnection of said releasable couplings.

6. A trailer as claimed in claim 1 wherein said jack means is carried by said platform at a location forward of said axle, which jack means is provided with ground-engaging means and is capable of lifting the forward end of said platform off the ground.

7. A trailer as claimed in claim 6, wherein the jack is hydraulically operated.

8. A trailer as claimed in claim 7, wherein the jack is supplied by a pump, driven by a motor carried by the platform.

9. A trailer as claimed in claim 1, wherein the hinge bearing parts of said open hinges are constituted by frames at each side of the platform.

10. A trailer or semi-trailer as claimed in claim 9, wherein each frame is outwardly pivotable to lie in or below the plane of the platform.

11. A trailer as claimed in claim 1, wherein each hinge pin is formed by a roller on a stub shaft carried by the swan neck.

References Cited

UNITED STATES PATENTS 3,384,390  5/1968  Moiriat et al. _____ 280—423

FOREIGN PATENTS 1,058,601  2/1967  Great Britain.
1,288,668  2/1962  France.

LEO FRIAGLIA, Primary Examiner

U.S. Cl. X.R.

214—505